(12) United States Patent
Bakker

(10) Patent No.: US 9,938,832 B2
(45) Date of Patent: Apr. 10, 2018

(54) ROTOR BALANCING

(71) Applicant: ROLLS-ROYCE PLC, London (GB)

(72) Inventor: Mattheus Bakker, Nuneaton (GB)

(73) Assignee: ROLLS-ROYCE plc, London (GB)

( * ) Notice: Subject to any disclaimer, the term of this patent is extended or adjusted under 35 U.S.C. 154(b) by 441 days.

(21) Appl. No.: 14/694,778

(22) Filed: Apr. 23, 2015

(65) Prior Publication Data

US 2015/0337662 A1    Nov. 26, 2015

(30) Foreign Application Priority Data

May 23, 2014    (GB) .................................. 1409245.6

(51) Int. Cl.
| | |
|---|---|
| *F01D 25/04* | (2006.01) |
| *F01D 5/02* | (2006.01) |
| *B25B 13/48* | (2006.01) |
| *B25B 23/10* | (2006.01) |

(Continued)

(52) U.S. Cl.
CPC ............ *F01D 5/027* (2013.01); *B25B 13/481* (2013.01); *B25B 23/105* (2013.01); *B25B 23/12* (2013.01); *F05D 2220/32* (2013.01); *F05D 2230/60* (2013.01); *F05D 2240/24* (2013.01); *F05D 2260/15* (2013.01); *F05D 2260/30* (2013.01);

(Continued)

(58) Field of Classification Search
CPC ....... F01D 5/027; F01D 25/04; B25B 23/105; B25B 13/481; B25B 23/12; F05D 2260/15; F05D 2260/30; F05D 2220/32; F05D 2240/24; F05D 2230/60; Y10T 464/50; F16F 15/322; F16F 15/34; F16F 15/32; F16B 21/02

See application file for complete search history.

(56) References Cited

U.S. PATENT DOCUMENTS

| | | | | |
|---|---|---|---|---|
| 2,964,972 A | * | 12/1960 | Jameson ................. | F01D 5/027 415/219.1 |
| 3,736,811 A | * | 6/1973 | Neary ..................... | F01D 5/027 416/144 |

(Continued)

FOREIGN PATENT DOCUMENTS

| | | |
|---|---|---|
| DE | 2705001 A1 | 8/1978 |
| EP | 1285843 A2 | 2/2003 |

(Continued)

OTHER PUBLICATIONS

Oct. 9, 2015 Search Report issued in European Patent Application No. 15 16 4810.

(Continued)

*Primary Examiner* — Ninh H Nguyen
*Assistant Examiner* — Eldon Brockman
(74) *Attorney, Agent, or Firm* — Oliff PLC

(57) ABSTRACT

A balancing kit and balancing method is provided for balancing a rotating component. The balancing kit comprises a receptacle and a balancing mass. The balancing mass comprises a pin that may be passed through a corresponding slot in a plate of the receptacle during installation. To complete installation, the balancing mass is rotated so that the pin can no longer pass through the slot, and is instead retained in an installed position in which the pin rests on a lower surface of the plate. The balancing mass can be removed by the reverse process.

17 Claims, 6 Drawing Sheets

(51) Int. Cl.
  *B25B 23/12*    (2006.01)
  *F16B 21/02*    (2006.01)

(52) U.S. Cl.
  CPC ............. *F16B 21/02* (2013.01); *Y02T 50/671* (2013.01); *Y10T 29/49947* (2015.01)

(56) References Cited

U.S. PATENT DOCUMENTS

| | | | | |
|---|---|---|---|---|
| 3,985,465 | A * | 10/1976 | Sheldon | F01D 5/027 415/189 |
| 4,064,762 | A * | 12/1977 | Wikner | B25B 27/0078 29/255 |
| 4,442,571 | A | 4/1984 | Davis et al. | |
| 5,205,189 | A | 4/1993 | Wesling et al. | |
| 5,545,010 | A * | 8/1996 | Cederwall | F01D 5/027 415/201 |
| 5,688,093 | A * | 11/1997 | Bowers | F16B 5/10 411/544 |
| 5,690,460 | A * | 11/1997 | Attanasio | F16B 5/10 411/551 |
| 6,279,420 | B1 * | 8/2001 | Knorowski | B25B 13/48 409/141 |
| 6,477,916 | B2 * | 11/2002 | Knorowski | B25B 13/48 29/255 |
| 8,322,991 | B2 * | 12/2012 | MacFarlane | F01D 5/027 416/144 |
| 9,017,029 | B2 * | 4/2015 | Pichel | F01D 5/027 416/144 |
| 9,127,555 | B2 * | 9/2015 | Muscat | F01D 5/027 |
| 9,334,737 | B2 * | 5/2016 | Race | F01D 5/027 |
| 2002/0029653 | A1 * | 3/2002 | Knorowski | B25B 13/48 416/224 |
| 2005/0265846 | A1 * | 12/2005 | Przytulski | F01D 5/027 416/144 |
| 2006/0266114 | A1 * | 11/2006 | Pichel | F01D 25/285 73/460 |
| 2010/0260605 | A1 * | 10/2010 | MacFarlane | F01D 5/027 416/144 |
| 2010/0296931 | A1 | 11/2010 | Girard | |
| 2011/0078901 | A1 | 4/2011 | Glasspoole et al. | |
| 2012/0151937 | A1 * | 6/2012 | Muscat | F01D 5/027 60/805 |
| 2012/0282082 | A1 * | 11/2012 | Pichel | F01D 9/065 415/119 |
| 2014/0050566 | A1 * | 2/2014 | Race | F01D 5/027 415/119 |

FOREIGN PATENT DOCUMENTS

| | | |
|---|---|---|
| GB | 0903176 A | 8/1962 |
| GB | 2454590 A | 5/2009 |
| JP | 2010-184621 A | 8/2010 |

OTHER PUBLICATIONS

Nov. 21, 2014 Search Report issued in British Patent Application No. 1409245.6.

* cited by examiner

ROTOR BALANCING

CROSS-REFERENCE TO RELATED APPLICATIONS

This application is based upon and claims the benefit of priority from British Patent Application Number 1409245.6 filed 23 May 2014, the entire contents of which are incorporated by reference.

BACKGROUND

1. Field of the Disclosure

The present disclosure relates to balancing a rotating part, such as a rotating part of a gas turbine engine. Aspects of the present disclosure relate to a balancing kit, a balancing mass, a balancing receptacle, and a balancing method.

2. Description of the Related Art

The rotor discs of compressors and turbines of gas turbine engines rotate at very high speed in use. It is important for the rotating components, including the discs, to be properly balanced, because any imbalance may result in unwanted movement of the rotating components, for example due to bending of a shaft about which the rotating components rotate. This may result in unwanted contact between rotating and stationary parts and/or an increase in the required tolerance gap between rotating and stationary parts, such as between rotating blades and surrounding cases. In turn, this may result in efficiency losses and/or vibrations, which may lead to damage, for example to bearings.

Accordingly, rotating discs of gas turbine engines need to be precisely balanced during manufacture and assembly. The discs may be balanced firstly during manufacture of the discs themselves, for example by removing material in a conventional manner. The discs may then be precision balanced again after assembly with other rotating components, such as blades that are attached to the disc. It may also be necessary to re-balance rotating components, such as discs, during service of the engine.

One method for precision balancing rotors involves providing grub screws to a rotor disc at various positions around its circumference. The grub screws may be screwed into corresponding threads in the disc. In this way, the rotor can be balanced by selecting the appropriate position and/or number of grub screws around the disc.

As mentioned above, a disc may need to be re-balanced through its service life, for example due to wear. However, where grub screws are used to balance a disc, the screws may seize in their threads during operation. This may be due to the extreme operating environment, including very high temperatures. This means that rebalancing of a disc may be extremely difficult, particularly rebalancing of a disc in-situ. The problem is exacerbated because the grub screws need to be particularly tight during operation of the engine to ensure that they do not become loose, because if a screw were to come free during operation it could cause significant damage to the engine. Thus, the grub screws need to be tight, but this increases the possibility of the seizing.

OBJECTS AND SUMMARY

Accordingly, it is desirable to be able to balance and optionally re-balance a rotor in a reliable and straightforward manner.

According to an aspect, there is provided a balancing kit for balancing a rotating part of a gas turbine engine. The balancing kit comprises a balancing mass. The balancing mass comprises an interface portion defining tooling interface. The balancing mass comprises a retaining member. The balancing mass comprises a resilient member located between the interface portion and the retaining member. The balancing kit comprises a receptacle for receiving the balancing mass. The receptacle comprises a receiving opening for receiving the balancing mass. The receptacle comprises a retaining plate having an upper surface and a lower surface, and a hole extending therethrough. The hole is non-axisymmetric about a longitudinal (or central) axis of the receptacle. The retaining member of the balancing mass is arranged to be able to pass through the hole for installation in the receptacle. The balancing mass is rotatable via its tooling interface. The retaining member can thereby be rotated so as to rest on (and/or be biased towards) the lower surface of the retaining plate to thereby removably secure the balancing mass to the receptacle in an installed position under the action of the resilient member.

According to an aspect, there is provided a balancing mass as described and claimed herein in relation to the balancing kit. According to an aspect, there is provided a balancing mass for balancing a rotor. The balancing mass comprises an interface portion defining tooling interface. The balancing mass comprises a retaining member. The balancing mass comprises a resilient member located between the interface portion and the retaining member. The retaining member is arranged (for example shaped) to be able to pass through a hole in a retaining plate provided to the rotor for installation into the rotor. The tooling interface is arranged to transmit a torque to the balancing mass (for example from a tool) to rotate it to an installed position. In the installed position, the retaining member rests on a lower surface of the retaining plate to retain the balancing mass in the installed position under the action of the resilient member. The balancing mass may be described as non-threaded.

According to an aspect, there is provided a receptacle for receiving a balancing mass as described and claimed herein. According to an aspect, there is provided a receptacle comprising a receiving opening for receiving the balancing mass. The receptacle comprises a retaining plate having an upper surface and a lower surface, and a hole extending therethrough. The hole is non-axisymmetric about a longitudinal axis of the receptacle. The hole is shaped to allow a retaining member of the balancing mass to pass therethrough for installation of the balancing mass in the receptacle. The retaining plate is arranged to allow the retaining member to rest on the lower surface thereof following rotation of the balancing mass after the retaining member has passed through the hole, thereby removably securing the balancing mass to the receptacle in an installed position under the action of the resilient member.

According to an aspect, there is provided a method of balancing a rotor of a gas turbine engine. The method comprises providing the rotor with at least one receptacle for receiving a respective balancing mass. The receptacle comprises a receiving opening for receiving the balancing mass. The receptacle comprises a retaining plate having an upper surface and a lower surface, and a hole extending therethrough. The hole is non-axisymmetric about a longitudinal axis of the receptacle. The method further comprises installing a balancing mass to one or more selected receptacles in order to balance the rotor. The balancing mass comprises an interface portion defining tooling interface; a retaining member; and a resilient member located between the interface portion and the retaining member. The step of installing the balancing mass to its respective receptacle comprises: passing the retaining member through the hole; and rotating the balancing mass into an installed position. The balancing mass may be rotated by providing torque to its tooling interface. In the installed position, the retaining member rests on the lower surface of the retaining plate to thereby removably secure the balancing mass to the receptacle under the action of the resilient member.

The method may comprise a determining step in which the selection of receptacles to which balancing masses should be provided and/or the mass of the balances is determined. Any suitable technique may be used in such a determining step, for example previously known techniques for deciding on the position/mass of one or more balancing masses to balance a rotating part.

In any arrangement and/or method described and/or claimed herein, the non-axisymmetric hole may comprise at least one slot. The slot may extend from an axisymmetric (or circular) hole, so as to form the non-axisymmetric hole. In such an arrangement, the retaining member may be arranged to pass through the slot(s).

The hole of the receptacle and the opening of the receptacle may be said to be in communication with each other, that is they may be said not to have any walls separating them.

The longitudinal axis of the receptacle may be aligned with (for example collinear with) a longitudinal axis of the balancing mass during installation and/or when the balancing mass is in the installed position. The longitudinal axis may be the axis along which the balancing mass is translated and/or about which the balancing mass is rotated for installation.

During the step of passing the retaining member through the hole, the resilient member may be supported on the upper surface of the plate so as to be compressed between the plate and the interface portion.

In straightforward terms, the method may be said to involve installation and/or removal of a balancing mass. Installation may involve pressing the balancing mass along its longitudinal axis, rotation (or turning) of the balancing mass about its longitudinal axis into an installed position, and then release of the balancing mass in the installed position. Removal may involve the same steps, but with the rotation being in the opposite direction about the longitudinal axis.

The methods, balancing kits, receptacles and balancing masses described and claimed herein allow straightforward and reliable balancing of a rotating part. The balancing masses are not susceptible to seizure, may be easily removed and re-fitted after engine running, and/or allow straightforward re-balancing of a rotor after a period of use.

It will be appreciated that any features described and/or claimed herein may apply to a balancing mass, receptacle, balancing kit and/or method as applicable.

In the installed position the resilient member may be compressed between the interface portion of the balancing mass and the upper surface of the retaining plate of the receptacle.

The balancing mass may be said to have a longitudinal axis. The interface portion may be a proximal end region of the longitudinal axis. The retaining member may be at an opposing distal end region of the longitudinal axis. In the balancing method, the step of passing the retaining member through the slot may involve moving the balancing mass (and thus the retaining member) relative to the receptacle (and thus the retaining plate) along the longitudinal axis. The step of rotating the balancing mass into an installed position may involve rotating the balancing mass about the longitudinal axis. The retaining plate of the receptacle may be offset from the receiving opening along a direction that corresponds to a longitudinal axis. When installed, the balancing mass and the receptacle may have respective longitudinal axes that are collinear.

The interface portion may have a cross-section that has an outer perimeter that is axisymmetric about the longitudinal axis. The receiving opening may have a cross-section that has an inner perimeter that is axisymmetric about the longitudinal axis. The tooling interface may be arranged so as to be able to rotate the balancing mass about the longitudinal axis into the installed position.

The cross-sectional shape of the interface portion may correspond to the cross-sectional shape of the receiving opening. The cross-sectional shapes of the (outer perimeter of) the interface portion and the receiving opening may be circular. During installation or removal of a balancing mass from a respective receptacle, the tooling interface may rotate within the receiving opening.

The balancing mass may comprise a main body extending from the interface portion along the longitudinal axis. The retaining member may extend from the balancing mass, for example from the main body of the balancing mass. The retaining member may not be axisymmetric about the longitudinal axis.

The shape of the hole in the retaining plate, including any slot, is not axisymmetric, for example about an axis normal to the hole. The shape of the hole in the retaining plate may, however, be axisymmetric (for example circular) without a slot. Thus, one or more slots may extend from an axisymmetric (or circular) portion of the hole. The shape of the slot may correspond to the shape of the retaining member.

Where the balancing mass is said to have a main body, the main body may be axisymmetric about the longitudinal axis.

The retaining member may take any suitable form. For example the retaining member may comprise at least one elongate pin extending in a plane perpendicular to the longitudinal axis. Such an elongate pin may be said to extend in a plane that is perpendicular to the direction in which the balancing mass moves in order to pass the retaining member through the slot. Such an elongate pin may be said to extend in a plane that is perpendicular to the axis about which the balancing mass is rotated after the retaining member has been passed through the hole (for example through a slot), to the installed position.

The retaining member may comprise more than one pin, for example two, three, four or more than four pins. Where the retaining member comprises more than one pin, the pins may be equally spaced around the balancing mass, for example around the longitudinal axis of the balancing mass. For example, where the retaining member has two pins, these may be diametrically opposed.

In addition to the retaining member, at least a part of the balancing mass from which the retaining member extends, for example at least a part of a main body, may also pass through the hole in the retaining plate when in the installed position. The hole in the retaining plate may be said to have a first portion (which may be axisymmetric, such as circular) through which a main body of the balancing mass may pass, and a second portion (which may not be axisymmetric) through which the retaining member may pass. The shape of the first portion may be said to correspond to the shape of the cross-section of the main body, and the shape of the second portion may be said to correspond to the shape of the retaining member.

In the installed position, the retaining member may rest on any part of the lower surface of the retaining plate. Optionally, the lower surface of the retaining plate may comprise a retaining recess having a shape that corresponds with the retaining member, such that in the installed position, the retaining member engages the retaining recess. This may help to retain the retaining member, and thus the balancing mass, in a fixed position during use.

According to an aspect, there is provided a rotor for a gas turbine engine comprising at least one balancing kit as described and/or claimed herein. In such an arrangement, the receptacle of the or each balancing kit may be provided to the rotor (for example around the circumference of the rotor), and at least one of the or each receptacle may be provided with its respective balancing mass. Any number of receptacles may be provided to the rotor, for example between 1 and 50 or more, for example 2 and 40, for example 5 and 30, for example 10 and 20. Such a rotor may be particularly straightforward to balance and/or re-balance, for example in situ in an engine.

Any selected combination of balancing masses may be used in order to balance the rotor. For example, where a rotor is provided with at least two balancing kits, at least one of the receptacles may not be provided with a respective balancing mass. Additionally or alternatively, at least two receptacles may be provided with balancing masses that have different masses to each other.

The balancing kit and/or method described and claimed herein may be used to balance any type of rotor or rotatable part of a gas turbine engine. For example, the rotatable part may be or may comprise a rotatable disc of a gas turbine engine, such as a compressor or a turbine disc, to which blades may be attached.

BRIEF DESCRIPTION OF THE DRAWINGS

According to an aspect, there is provided a gas turbine engine comprising a rotor balanced using a balancing kit as described and/or claimed herein and/or using the method as described and/or claimed herein.

Embodiments of the disclosure will now be described by way of non-limitative example with reference to the accompanying drawings in which:

FIG. 4b shows a cross-section through the line A-A of the receptacle of FIG. 4a;

FIG. 5b shows a cross-section through the line B-B of the balancing mass of FIG. 5a.

DETAILED DESCRIPTION OF EMBODIMENTS

Figure 1:
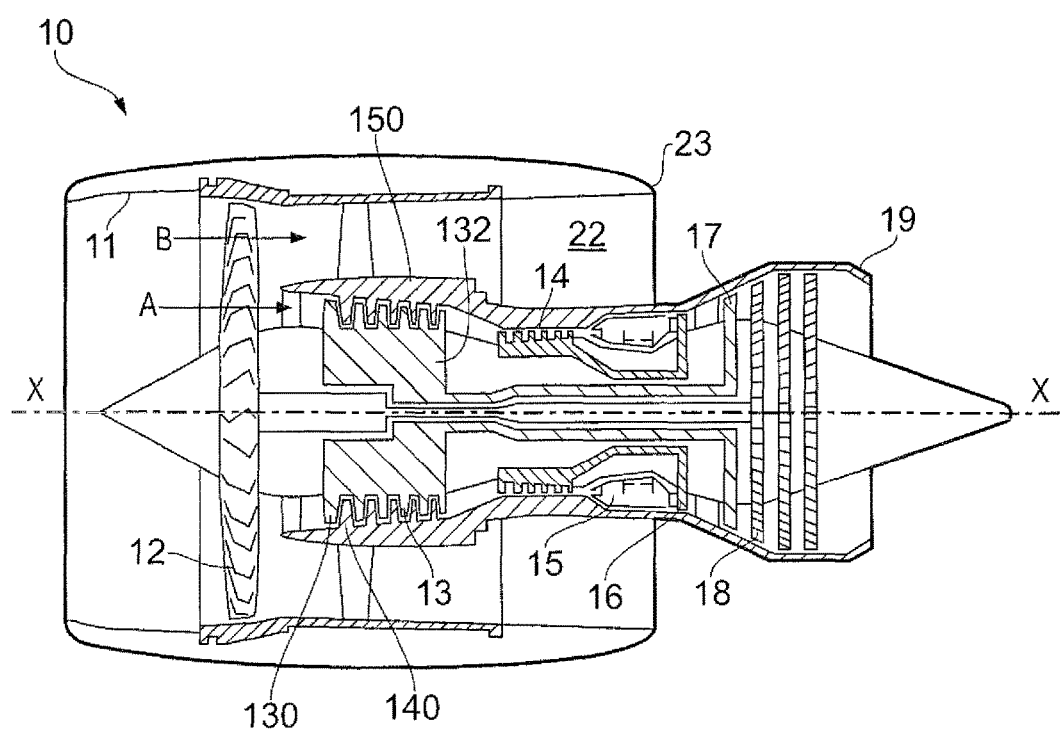
FIG. 1 shows a cross-section through a gas turbine engine according to the present disclosure.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Each of the high, intermediate and low-pressure turbines 16, 17, 18 and the intermediate and high-pressure compressors 13, 14 comprises at least one stage comprising a set of rotor blades and a set of stator vanes. In use, the rotor blades rotate around the engine axis X-X, whilst the stator vanes are stationary within the engine. Purely by way of example, in FIG. 1, the rotor blades of the intermediate pressure compressor 13 are given the reference numeral 130, and the stator vanes are given the reference numeral 140.

A rotor disc 132 may have one or more sets of rotor blades 130 attached thereto, from one or more stages. The rotor blades 130 may be attached to the rotor disc in any suitable manner, for example by manufacturing slots in the disc 132 into which the blades 130 are inserted, or by permanently joining the blades 130 to the disc 132 (for example by welding, for example linear friction welding or inertia welding), or by forming the disc 132 and the blades 130 from a single metal sheet.

The rotor blades 130 and the rotor disc 132 of any stage of the compressor or turbine rotate together at high rotational speed in use of the gas turbine engine 10. Accordingly, it is important to be able to precision balance the rotating parts of the gas turbine engine 10, such as the combined rotor disc 132 and rotor blades 130, for at least the reasons described herein. It may be advantageous to be able to precision balance the rotating parts when they are in-situ in the engine, and to be able to adjust the balance of the rotating parts after a period of service in a convenient manner.

Figure 2:
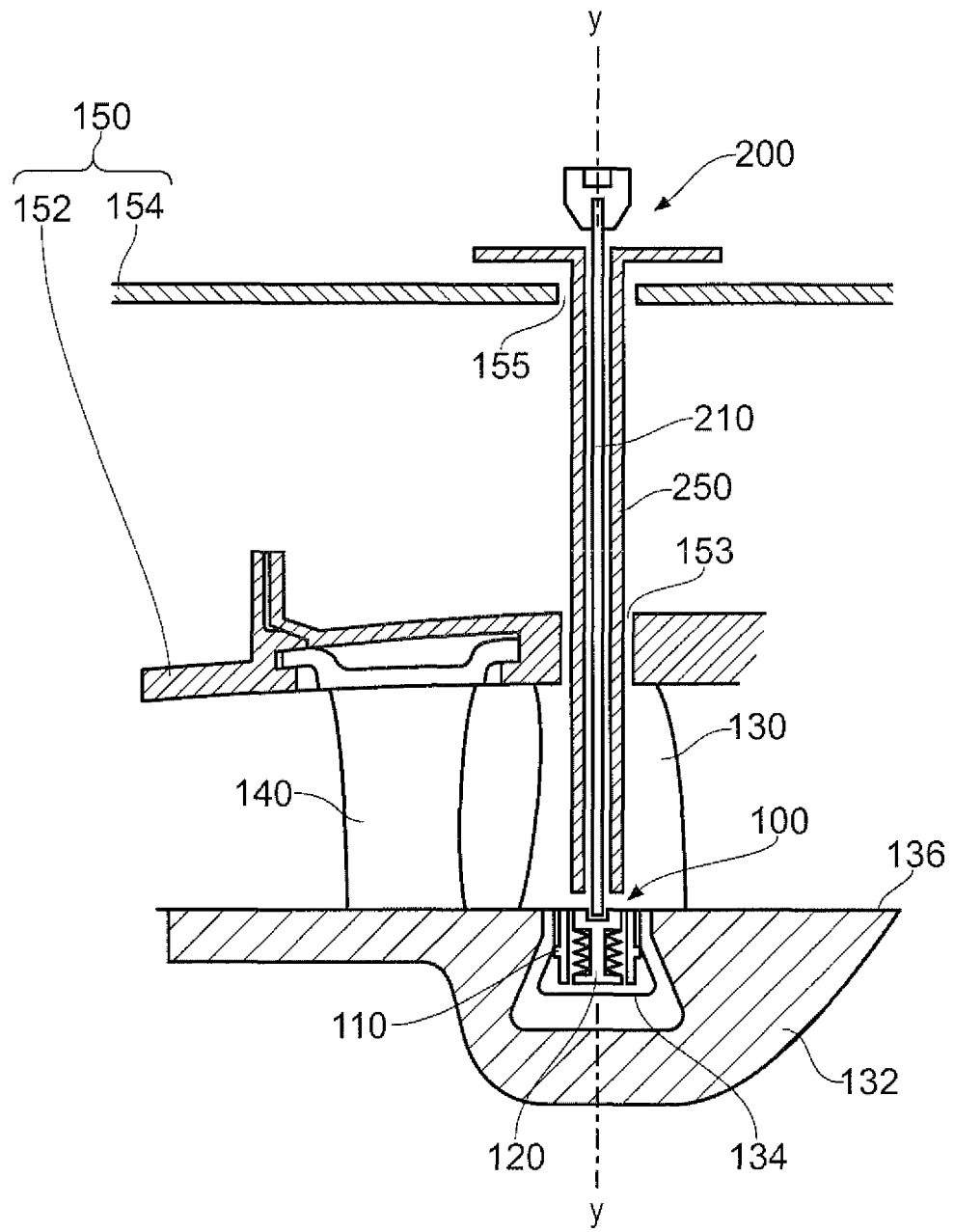
FIG. 2 shows a balancing kit according to the present disclosure being used to balance a rotor disc.

In FIG. 1, the rotor blades are shown as being radially inside an engine core casing 150, The engine core casing 150 is shown schematically in FIG. 1. In FIG. 2, the casing 150 is shown by way of example as comprising an inner casing 152 and an outer casing 154, the terms inner and outer referring to their relative radial positions. The stator vanes 140 may extend from the inner core casing 152, as in the FIG. 2 example.

The rotating parts may be balanced using a balancing kit 100. The balancing kit comprises a receptacle 110 and a balancing mass 120, both of which are described in greater detail below and elsewhere herein. The balancing kit 100 is shown in FIG. 2 in a slot (which may be a circumferentially extending slot, such as a dovetail slot) 134 formed in the rotor disc 132. During assembly of the gas turbine engine 10, the rotor blades (more precisely a root portion of each rotor blade 130) may be slotted into the slot 134 in the rotor disc 132 in order to secure the rotor blades 130 to the disc 132.

The balancing kit 100, for example the receptacle 110 thereof, may be secured in the slot 134 during assembly, for example between rotor blades 130. Accordingly, the receptacle 110 may be fixed in (or integral with) the disc 132.

A rotating part, such as the disc 132, may be provided with more than one balancing kit 100, or at least more than one receptacle 110 of a balancing kit 100, spaced around its circumference. The rotating part 132 may be balanced by inserting suitable balancing masses 120 into respective selected receptacles. The choice of mass of the balancing mass 120 and/or receptacle 110 into which to insert a balancing mass 120 in order to balance the rotating part 132 may be determined by any suitable method.

A balancing mass 120 may be inserted or removed into a respective receptacle prior to final assembly of the gas turbine engine 10 (for example during assembly of the rotor stage) and/or in situ (for example when the rotor stage is within the casing 150, as shown in FIG. 2). Accordingly, the rotating part 132 may be balanced after a period of service of the gas turbine engine 10 without stripping the engine.

As shown in FIG. 2, the balancing receptacle 110 may be accessible from outside the casing 150 (for example from outside an inner casing 152 and an outer casing 154) through one or more inspection holes 153, 155 formed in the inner and outer casings 152, 154. The inspection holes 153, 155 may be used for other purposes, for example for inserting a baroscope or other inspection into the engine core to inspect the core of the engine 10, for example during service or maintenance.

In some arrangements the receptacle 110 may be a part of, for example formed with and/or integral with, the rotating part 132.

In order to insert or remove a balancing mass 120 into a respective receptacle 110, a tool 200 may be used. Such a tool 200 is shown by way of example in FIG. 2. The tool 200 may be of any suitable form. For example, the tool may comprise an outer body 250 and a tightening body (which may be an elongate tightening body) 210. The tightening body 210 may be placed within a through hole in the outer body 250. In such an arrangement, the tightening body 210 is rotatable relative to the outer body 250 about their common longitudinal axes Y-Y.

As described elsewhere herein, in order to install a balancing mass 120 into a respective receptacle 110, it may be pressed (and thus translated) in the direction along its axis Y-Y (which may correspond to the radial direction of the rotating part 132), and then rotated about the same axis. This may be performed using a tool, such as the tool 200 shown in FIG. 2. In order to remove a balancing mass 120 from its receptacle 110, it may be rotated (for example by tool 200) to a release position, at which point it may be released and/or separated from the receptacle 110. When the balancing mass 120 is not held in its receptacle 110, it may, for example, be removably secured to the tool 200, for example in any suitable manner, such as using a magnet and/or a recess (not shown) in the tool 200 into which the balancing mass may be drawn.

Figure 3:
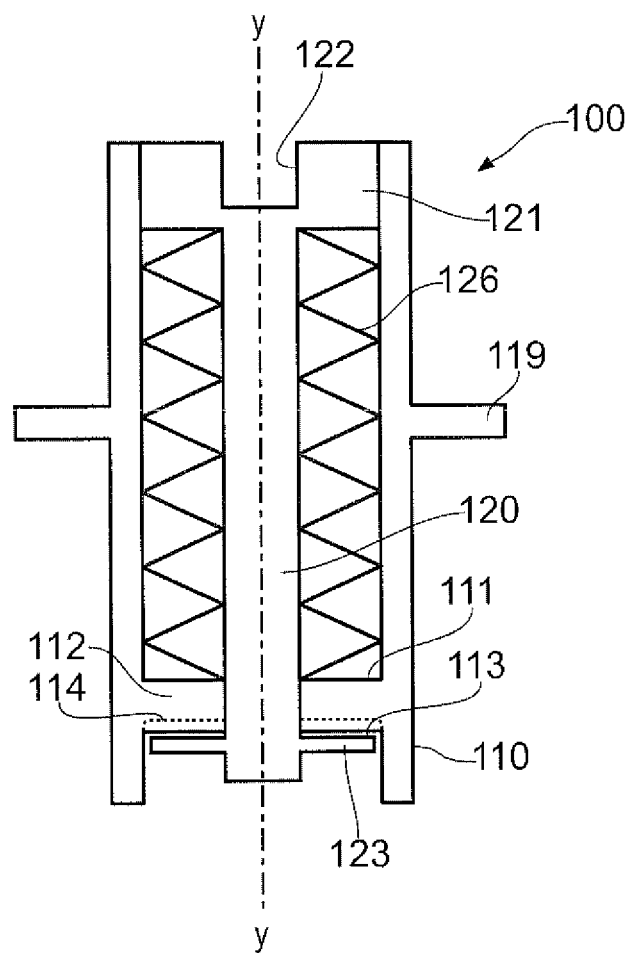
FIG. 3 shows a detailed cross-section through a balancing kit according to the present disclosure.
Figure 4A:
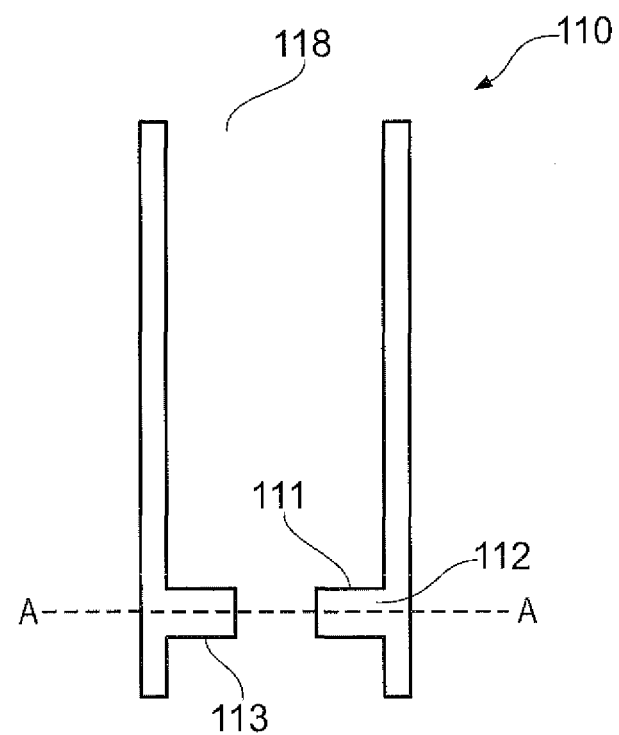
FIG. 4a shows a detailed cross-section through a receptacle according to the present disclosure.
Figure 4B:
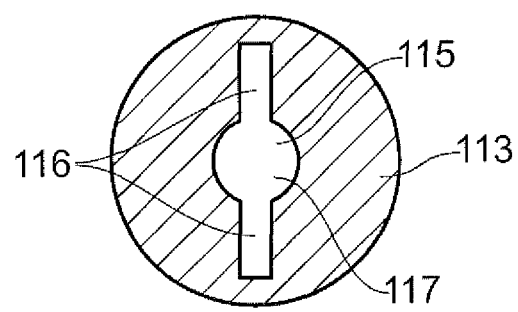
Figure 5A:
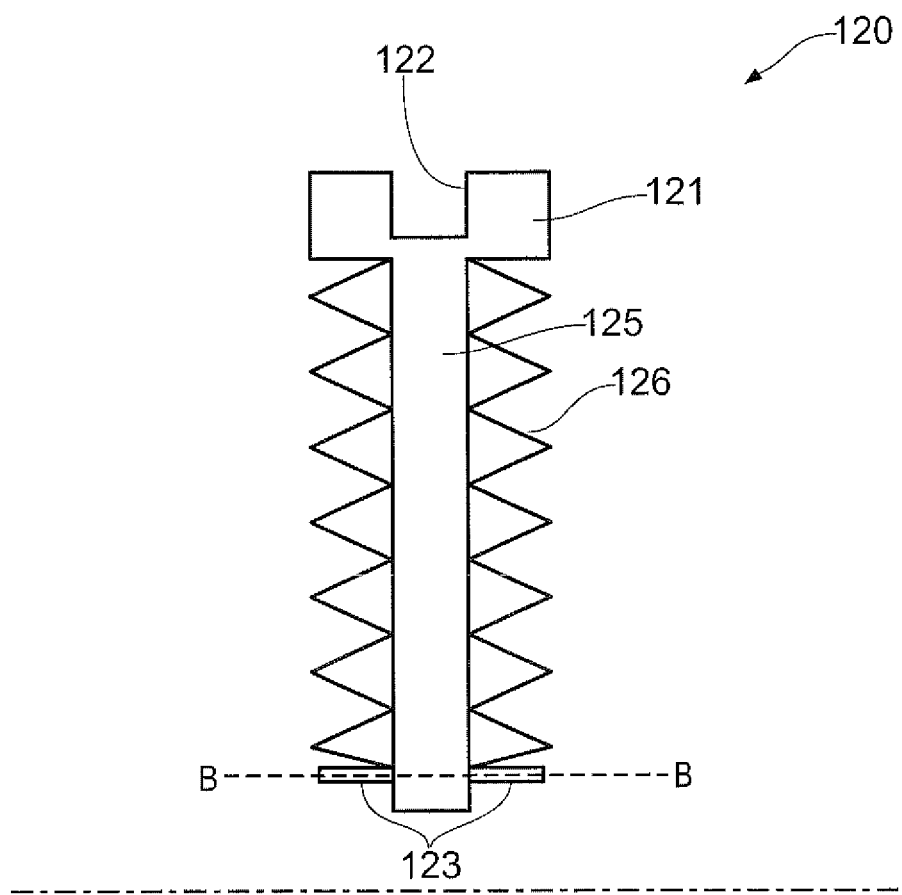
FIG. 5a shows a detailed cross-section through a balancing mass according to the present disclosure.
Figure 5B:
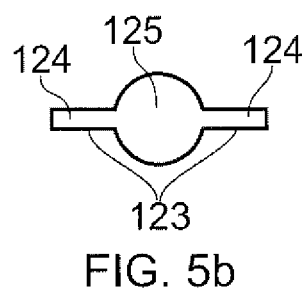

FIG. 3 shows a cross-section through an example of a balancing kit 100 including a receptacle 110 and a balancing mass 120 in greater detail. In FIG. 3, the balancing mass 120 is shown in an installed position in the receptacle 110. FIG. 4a shows a cross-section through the centreline of an example of a receptacle 110 that may be used as part of a balancing kit 100 such as that described herein, and FIG. 4b shows a cross-section through the line A-A in FIG. 4a. FIG. 5a shows a cross-section through the centreline of an example of a balancing mass 120 that may be used as part of a balancing kit 100 such as that described herein, and FIG. 5b shows a cross-section through the line B-B of FIG. 5a. Like features in the Figures are given like reference numerals, and reference may be made to all of the Figures in the description provided herein.

The balancing mass 120 has an interface portion 121. The interface portion 121 is arranged to receive a force and/or torque for installing and/or removing the balancing mass 120 from an installed position (for example in a receptacle 110) to a removed, or detached position. The interface portion 121 may define a tooling interface 122 for this purpose. The tooling interface 122 may be arranged to receive any suitable tool for providing the torque and/or force, such as the tool 200 shown purely by way of example in FIG. 2. For example, the tooling interface 122 may be a key shape, such as a hex-key shape (or Allen key shape), a slot, a cross, a torque drive shape or a star drive shape.

The balancing mass 120 also comprises a retaining member 123. In the example shown in FIGS. 3 and 5, the retaining member 123 comprises two pins 124. The two pins extend from a main body 125 of the balancing mass 120. The main body 125 itself may be axisymmetric about a central axis Y-Y, and may have a circular cross-section. However, a cross-section through the balancing mass 120 that is perpendicular to the central axis Y-Y and passes through the main body 125 and the retaining member 123 may not be axisymmetric, for example as shown in the FIG. 5b example. The balancing mass 123 may comprise any suitable retaining member 123. For example, as alternatives to the arrangement shown in FIG. 5b, a retaining member 123 may comprise just one pin 124, or more than two pins 124, for example 3, 4, 5 or more than 5 pins 124.

In the installed position shown in FIG. 3, the retaining member 123 rests on a retaining surface 113 of the receptacle 110, which is shown clearly in FIG. 4b. Optionally, the retaining member may rest or sit in a retaining recess 114, shown by the dashed line in FIG. 3, which may extend into the retaining surface 113 (which may be referred to elsewhere herein as the lower surface 113). The retaining surface 113 of the receptacle 110 may be defined by another feature of the receptacle 110, such as by a retaining plate 112 (which may be any sort of body).

The retaining surface 113 (and/or the retaining plate 112 by which it is defined) has a hole 115 therein. The hole 115 in the FIGS. 3 and 4 example extends entirely through the retaining plate 112. In the example of FIGS. 3 and 4, the hole 115 has two slots, or slot portions, 116. The slots 116 extend from a central hole portion 117. The central hole portion 117 may be axisymmetric, as shown in the FIG. 4b example.

Other arrangements of retaining plate 112 may have different non-axisymmetric shapes, for example different numbers of slots 116, for example 1, 3, 4, 5 or more than 5 slots 116. In general, the number of slots 116 may be equal to the number of retaining members 123 of the balancing mass 120. In general, the shape of the or each slot 116 may correspond to the shape (for example the plan form shape) of the or each retaining member 123. In general, the shape of a central hole portion 117 from which the slots 116 extend may correspond to the shape of the main body 125 from which the pins 124 of the balancing mass extend (for example at least to the shape of a cross-section through the main body at the position of the pins 123). In general the shape of the hole 115 may correspond to the shape of the balancing mass 120 at a cross-section through the balancing mass 120 perpendicular to the central axis Y-Y. The term correspond to may mean the same as or slightly offset from. For example, the hole 115 may be slightly larger (or offset from) the cross-section through the balancing mass 120 to allow the balancing mass 120 to pass therethrough.

The slot or slots 116 may actually be any suitable shape, for example any shape that results in the hole 115 not being non-axisymmetric and/or any shape that corresponds to the shape of the retaining member 123.

The balancing mass 120 also comprises a resilient member 126. The resilient member 126 may be a spring, such as a compression spring as shown by way of example in FIGS. 3 and 5. The resilient member 126 may comprise one or more disc springs. Such disc springs may extend around the main body 125 and/or around the central axis Y-Y. Alternatively, the resilient member 126 may take any suitable form, such as a compressible sponge and/or rubber-type material.

The resilient member 126 may extend generally from a first end region (which may correspond to an interface portion 121) to a second end region (which may correspond to the retaining member 123) of the balancing mass 120, along the direction of the central axis Y-Y. In the uninstalled position shown in FIG. 5a, the resilient member 126 may extend from the interface portion 121 to the retaining member 123. The resilient member 126 may not be fixed to the retaining member 123, such that the two features can be separated, for example during installation and in an installed position (such as that shown in FIG. 3).

The receptacle 110 comprises a receiving opening 118 for receiving the balancing mass 120 during installation (and through which the balancing mass 120 may be removed as required). The shape of the receiving opening 118 may correspond to (for example be the same as or slightly offset from) the outer perimeter shape of the interface portion 121 of the balancing mass 120. In the installed position (and during at least a part of the installation process), the interface portion 121 of the balancing mass 120 may be rotatable within the receiving opening 118. The receiving opening 118 and/or the outer perimeter of the interface portion 121 may be axisymmetric, for example circular in cross-section.

Figure 6:
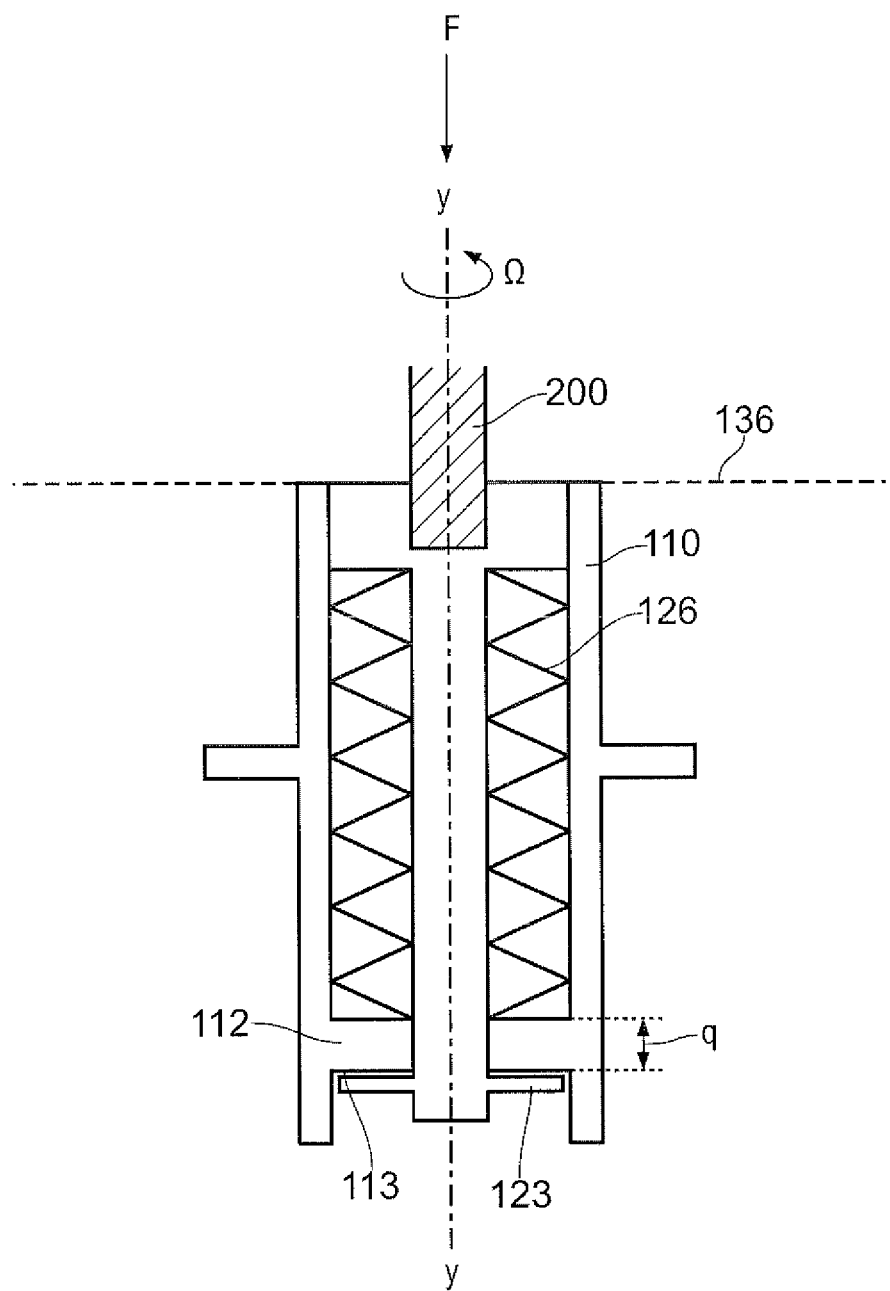
FIG. 6 shows a detailed schematic of a balancing mass being rotated within a receptacle for installation to or removal from a receptacle.

Referring now to FIG. 6, in order to install a balancing mass 120 into a receptacle 110 (for example to balance a rotating part 132), the balancing mass 120 may first be inserted into the receptacle 110 through the receiving opening (or mouth) 118. The balancing mass 120 may then be rotated, for example using a tool such as the tool 200, about its central (or longitudinal) axis Y-Y, indicated by the arrow Ω in FIG. 6, so as to align the retaining member 123 with the slot 116. If the retaining member 123 and slot 116 are not aligned, then the retaining member 123 sits, or rests, on the retaining plate 112, for example on an upper surface 111 thereof.

When the retaining member 123 and the slot 116 are aligned, the balancing mass 120 (that is, a part of the balancing mass 120) can be pushed through hole 115 in the retaining plate 112, by applying a force F (for example using a tool 200, which may be the same as the tool 200 used to rotate the balancing mass) along the central axis Y-Y. Thus, the balancing mass 120 may be said to be moved, or translated, in the direction of the central axis Y-Y relative to the receptacle 110. As the balancing mass 120 moves through the hole 115, the retaining member 123 and the resilient member 126 are separated. As the retaining member 123 moves through the slot portion 116 of the hole 115, the resilient member 126 rests on the upper surface 111 of the retaining plate 112. As the retaining member 123 moves through the slot portion 116 of the hole 115, the resilient member 126 becomes compressed between the retaining plate 112 (specifically the upper surface 111 thereof) of the receptacle 110 and the interface portion 121 of the balancing mass 120. The resilient member 126 remains compressed in this manner after installation.

The balancing mass 120 is moved relative to the receptacle 110 until the retaining member 123 is pushed all of the way through the retaining plate 112, as shown by the distance q in FIG. 6. At this point in the installation process, the balancing mass is rotated once more about its central (or longitudinal) axis Y-Y. The rotation may be performed using a tool 200, which may be the same tool that is used throughout the installation process. The rotation may take the balancing mass 120 to any angular position relative to the receptacle 110 at which the retaining member 123 and the hole 115 (or the slot portions 116 thereof) are not aligned. The balancing mass 120 may be said to be rotated to an installed position. In the installed position, the force F may be removed from the balancing mass 120, for example by removing the tool 200 from the tooling interface 122.

in the installed position (shown in FIGS. 3 and 6, for example), the retaining member 123 rests on the retaining plate 112, in particular on the lower surface 113 of the retaining plate 112. The resilient member 126 remains in the compressed (or more generally deformed) position, thereby holding the balancing mass 120 in the installed position in the receptacle 110. In the installed position, the balancing mass may be held in position (via the retaining member 123 engaging the retaining (lower) surface 113 of the receptacle) through the action of any one or more of: the resilient member 126; centrifugal acceleration due to rotation of the rotatable member 132 in use; and/or a retaining recess 114, where present.

In order to remove the balancing mass 120 from the receptacle 110, substantially the opposite procedure is followed. Accordingly, the balancing mass may be rotated about its central axis Y-Y until the retaining member 123 is aligned with the slot 116, for example using a tool 200. The retaining member 123 may then move through the slot 116 under the action of the resilient member 126 as it returns to its original shape. The balancing mass may then be free to be removed from the receptacle 110 in any suitable manner, for example by being drawn into a removal portion of a tool 200 (not shown) and/or by being magnetically attached to the tool 200.

In FIG. 6, the dashed line indicated by reference numeral 136 indicates the platform of the rotor blade 130. Accordingly, the position the top (or radially outer surface) of the receptacle 110 and/or the balancing mass 120 when in the installed position may be flush with the surface of the rotor blade platform 136.

The installation and removal of the balancing mass 120 from the receptacle 110 may be said to be of a bayonet-type arrangement. In general terms, the balancing mass 120 may be considered to be an inverted bayonet with a press and turn mechanism (for example a 90 degree press and turn mechanism, or any other suitable angle). The balancing mass 120 may be described as a cylindrical bar (or central body) 125 with a tooling interface 121 at one end, and a resilient member (such as spring washers) 126 held in place between the tooling interface 121 and a retaining member 123, such as a retention pin.

The receptacle 110 may be described as having a cylindrical hole or opening 118 extending therethrough and a narrowing 115 near the bottom. The narrowing may have a shaped or keyed portion 116 (which may comprise one or more slots) that corresponds at least in part to the shape of the retaining member 123 to allow the retaining member 123 to pass through for installation or removal.

In order to install the balancing mass 120 in the receptacle 110, the retaining member 123 may slide through the keyed portion 116, the resilient member 126 may be compressed; the balancing mass 120 may then be rotated and then released to allow the retaining member 123 to rest on the lower surface of the plate 112, for example in a retaining recess 114, where the balancing mass 120 may remain during engine running.

Whilst aspects of the disclosure have been described herein in relation to the exemplary arrangements shown in the Figures, it will be appreciated that various different arrangements and or modifications to the method and/or apparatus disclosed herein may be made without departing from the scope of the invention. Accordingly, the exemplary arrangements/methods set forth above are considered to be illustrative and not limiting. Purely by way of example, any receptacle 110 may (or may not) be provided with a fixing interface, such as that shown by feature 119 in FIG. 3. Such a fixing interface 119 may be one way of fixing, or securing, the receptacle 110 into the rotating part 132, for example into a slot (which may be a dovetail slot) 134 of a rotating disc 132. By way of further example, the receptacle 110 may have a portion that extends from the retaining plate 112 away from the direction of the opening 118, as shown in the Figures. This may provide sufficient space below the retaining plate 112 but within the receptacle 110 in which the retaining member 123 and at least a part of the central body 125 can rotate once the retaining member 123 has passed through the retaining plate 112.

Where reference is made herein to a gas turbine engine, it will be appreciated that this term may include may be any type of gas turbine engine, including, but not limited to, a turbofan (bypass) gas turbine engine, turbojet, turboprop, ramjet, scramjet or open rotor gas turbine engine, and for any application, for example aircraft, industrial, and marine application. Any feature described and/or claimed herein may be combined with any other compatible feature described in relation to the same or another embodiment.

I claim:

1. A balancing kit for balancing a rotating part of a gas turbine engine comprising:
    a balancing mass having:
        an interface portion defining tooling interface;
        a retaining member; and
        a resilient member located between the interface portion and the retaining member, and
    a receptacle for receiving the balancing mass having:
        a receiving opening for receiving the balancing mass; and
        a retaining plate having an upper surface and a lower surface, and a hole extending therethrough, the hole being non-axisymmetric about a longitudinal axis of the receptacle, wherein:
    the retaining member of the balancing mass is arranged to be able to pass through the hole for installation in the receptacle, and the balancing mass can be rotated via its tooling interface such that the retaining member rests on the lower surface of the retaining plate to thereby removably secure the balancing mass to the receptacle in an installed position under the action of the resilient member.

2. A balancing kit according to claim 1, wherein:
    the hole extending through the retaining plate comprises at least one slot; and
    the retaining member is arranged to pass through the slot for installation in the receptacle.

3. A balancing kit according to claim 1, wherein, in the installed position the resilient member is compressed between the interface portion of the balancing mass and the upper surface of the retaining plate of the receptacle.

4. A balancing kit according to claim 1, wherein:
    the balancing mass extends along a longitudinal axis, with the interface portion at a proximal end region of the longitudinal axis, and the retaining member at an opposing distal end region of the longitudinal axis.

5. A balancing kit according to claim 4, wherein:
    the interface portion has a cross-section that has an outer perimeter that is axisymmetric about the longitudinal axis of the balancing mass;
    the receiving opening has a cross-section that has an inner perimeter that is axisymmetric about the longitudinal axis of the balancing mass; and
    the tooling interface is arranged so as to be able to rotate the balancing mass about the longitudinal axis of the balancing mass into the installed position.

6. A balancing kit according to claim 4, wherein:
    the balancing mass comprises a main body extending from the interface portion along the longitudinal axis of the balancing mass; and
    the retaining member extends from the main body and is not axisymmetric about the longitudinal axis of the balancing mass.

7. A balancing kit according to claim 6, wherein the main body is axisymmetric about the longitudinal axis of the balancing mass.

8. A balancing kit according to claim 6, wherein the retaining member comprises at least one elongate pin extending in a plane perpendicular to the longitudinal axis of the balancing mass.

9. A balancing kit according to claim 6, wherein at least a part of the main body passes through the hole in the retaining plate when in the installed position.

10. A balancing kit according to claim 1, wherein the lower surface of the retaining plate comprises a retaining recess having a shape that corresponds to that of the retaining member, such that in the installed position, the retaining member engages the retaining recess.

11. A rotor for a gas turbine engine comprising at least one balancing kit according to claim 1, wherein the receptacle of the or each balancing kit is provided to the rotor, and at least one of the or each receptacle is provided with its respective balancing mass.

12. A rotor for a gas turbine engine according to claim 11 comprising at least two balancing kits, wherein at least one of the receptacles is not provided with a respective balancing mass.

13. A rotor for a gas turbine engine according to claim 11 comprising at least two balancing kits, wherein at least two receptacles are provided with balancing masses that have different masses to each other.

14. A gas turbine engine comprising a rotor balanced using the balancing kit according to claim 1.

15. A method of balancing a rotor of a gas turbine engine comprising:
    providing the rotor with at least one receptacle for receiving a respective balancing mass, the receptacle having:
        a receiving opening for receiving the balancing mass; and
        a retaining plate having an upper surface and a lower surface, and a hole extending therethrough, the hole being non-axisymmetric about a longitudinal axis of the receptacle the method further comprising installing a balancing mass to one or more selected receptacles in order to balance the rotor, the balancing mass having:
  an interface portion defining tooling interface;
  a retaining member; and
  a resilient member located between the interface portion and the retaining member,
wherein the step of installing the balancing mass to its respective receptacle comprises:
passing the retaining member through the hole; and
rotating the balancing mass into an installed position by providing torque to its tooling interface, in which installed position the retaining member rests on the lower surface of the retaining plate to thereby removably secure the balancing mass to the receptacle under the action of the resilient member.

16. A method of balancing a rotor according to claim 15, wherein, during the step of passing the retaining member through the hole, the resilient member is supported on the upper surface of the plate so as to be compressed between the plate and the interface portion.

17. A gas turbine engine comprising a rotor balanced using the method according to claim 15.

\* \* \* \* \*